April 15, 1958 — R. M. GRAMS — 2,830,556
ELECTRIC ANIMAL RESTRAINING DEVICE
Filed Feb. 8, 1957
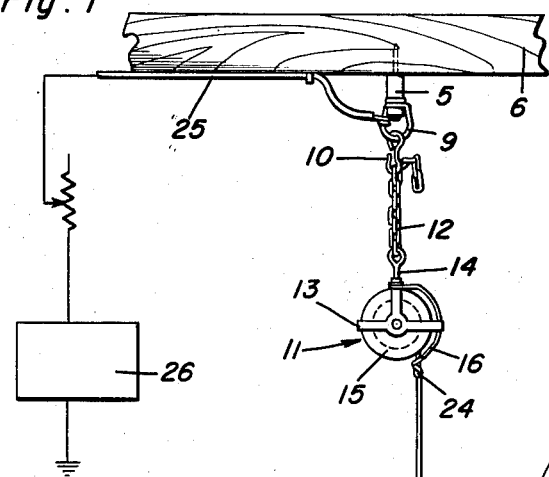
Fig. 1
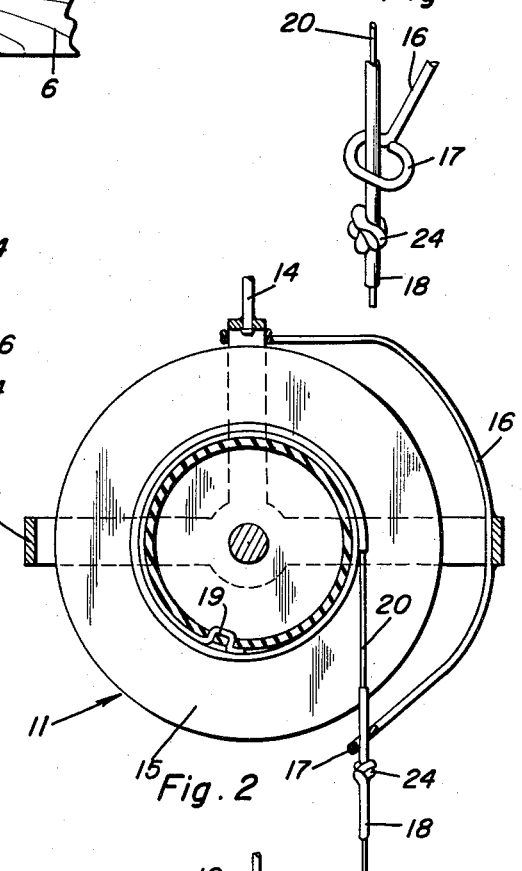
Fig. 2
Fig. 4
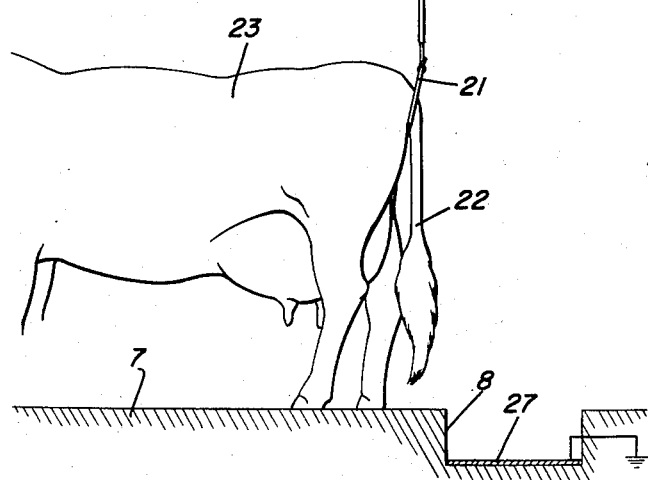
Fig. 3
Raymond M. Grams
INVENTOR.

United States Patent Office 2,830,556
Patented Apr. 15, 1958

2,830,556

ELECTRIC ANIMAL RESTRAINING DEVICE

Raymond M. Grams, Deerbrook, Wis.

Application February 8, 1957, Serial No. 639,166

4 Claims. (Cl. 119—27)

The present invention relates to new and useful improvements in animal controlling or restraining devices to be used particularly in dairy barns and has for its primary object to provide, in a manner as hereinafter set forth, novel means for preventing a cow from standing with its hind feet in the usual gutter at the rear of the platform or stall.

Another very important object of the invention is to provide a restraining or controlling device of the aforementioned character comprising means for automatically electrically shocking the cow should the animal drop its hind feet into the gutter.

Other objects of the invention are to provide an automatic restraining or controlling device of the character described which will be comparatively simple in construction, durable, compact, highly efficient and reliable in use and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and which:

Figure 1 is a view in side elevation, illustrating a device embodying the present invention in use, showing a portion of the electric system diagrammatically;

Figure 2 is a view in vertical section through the spring reel unit;

Figure 3 is a detail view of the conductor wire achoring ring which is mounted on the tail of the animal; and Figure 4 is a perspective view of the contact ring and an intermediate portion of the conductor cord.

Referring now to the drawing in detail, it will be seen that the embodiment of the invention which has been illustrated comprises an insulator 5 which is secured beneath the usual ceiling 6 of a barn above a platform or stall 7 in said barn. Reference character 8 designates the usual gutter at the rear of the platform or stall 7.

Mounted on the insulator 5 and depending therefrom is a metallic loop 9. A hook 10, also of metal, is suspended from the loop 9.

A reel unit 11 is suspended from the hook 10 through the medium of a chain 12 of suitable metal. The links of the metallic chain 12 are selectively engageable in the hook 10 for vertically adjusting the unit 11.

The unit 11 includes a metallic frame 13 swivelly mounted on an eye 14, also of metal, to which one end of the chain 12 is connected. Journaled in the frame 13 is a drum or reel 15 of suitable insulating material.

Also mounted on the frame 13 adjacent the periphery of the drum or reel 15 and extending from the upper portion of said frame to a point below said drum or reel is a metallic rod 16. The lower end of the rod 16 is free and formed to provide a contact ring or loop 17.

A conductor cord 18 is slidable through contact ring 17 and has one end anchored to the drum 15, as at 19, for winding thereon. A suitable spring (not shown) actuates the drum 15 for winding the conductor cord 18 thereon. Adjacent the drum 15 the conductor cord 18 includes a skinned or bare portion 20 for engagement with the contact ring 17. The lower or free end of the conductor cord 18 is electrically connected to a metallic anchoring loop or ring 21 which is adapted to be slipped on the tail 22 of the cow 23 to be restrained or controlled. The conductor cord 18 is knotted to provide a stop 24 which is engageable with the contact ring 17 for arresting said conductor cord after it has been rewound sufficiently on the drum 15 to disengage the stripped or skinned bare portion 20 from said contact ring.

Reference character 25 designates a conductor wire electrically connected to the loop 9. The conductor wire 25 is connected to any suitable source of electric current through a conventional electric fence controller 26.

It is thought that the operation of the device will be readily apparent from a consideration of the foregoing. Briefly, when the cow 23 is standing with all four feet on the platform or stall 7, as shown, the bare portion 20 of the wire of the conductor cord 18 is out of engagement with the contact ring 17, as shown in Figure 2 of the drawing. However, should the cow 23 place either or both hind feet in the gutter 8, thus lowering its rear end, the conductor cord 18 is unwound from the drum 15 and the bare portion 20 of said conductor cord contacts the ring 17. In this manner, the animal is electrically shocked and will step upwardly out of the gutter. The cord 18 is then rewound on the drum 15 for disengaging the element 20 from the element 17, thereby reopening the electric circuit. If desired, this circuit may include a ground plate 27 of suitable metal in the bottom of the gutter 8. As the conductor cord 18 is rewound, it is arrested by the stop 24 immediately after the bare portion 20 thereof passes through the ring 17. Should the animal lie down, the relatively short bare portion 20 of the conductor cord 18 passes quickly through and below the contact ring 17, thereby subjecting said animal to the electric current for only an instant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal restraining device of the character described comprising: a reel unit suspended from a support and including a drum, an electric contact ring mounted on the unit and connected to a source of electricity, and an insulated conductor cord slidable through said ring and having one end secured to the drum for winding thereon and its free end electrically connected to the animal for actuation thereby for unwinding the cord from the drum, said cord including an uninsulated portion engageable with the ring for closing an electric circuit to the animal when said cord is unwound from the drum.

2. An animal restraining device of the character described comprising: a reel unit including a metallic frame, a drum of insulating material journaled in said frame, means for suspending said unit from a support, means for electrically connecting the frame to a source of current, a contact ring mounted on the frame and electrically connected thereto, an insulated conductor cord slidable through said ring and having one end secured to the drum for winding thereon, and a metallic loop on the free end of the cord for the reception of an animal's tail for electrically anchoring said cord to said animal, said cord including an uninsulated intermediate portion engageable with the ring when said ring is unwound from the drum for completing an electric circuit to the animal.

3. An animal restraining device of the character described comprising: an insulator for mounting beneath a ceiling, a metallic hook depending from said insulator, a reel unit, said reel unit including a metallic frame and a drum of insulating material journaled in said frame, a chain having one end connected to the frame, said chain including metallic links engageable selectively in the hook for adjustably suspending the reel unit from the insulator, a contact ring mounted on the frame and electrically connected thereto, an insulated conductor cord slidable through the ring and having one end secured to the drum for winding thereon, a metallic loop electrically connected to the free end of the conductor cord and engageable over the tail of an animal for electrically anchoring said conductor cord to said animal, said cord being operable by the animal for unwinding said cord from the drum, said cord including an uninsulated intermediate portion engageable with the ring when said cord is unwound from the drum for closing an electric circuit to the animal, and means for connecting the chain to a source of electric current.

4. An animal restraining device of the character described comprising: a reel unit including a frame and a spring retracted drum of insulating material journaled in said frame, a contact ring on the frame adjacent the drum, means electrically connecting said contact ring to a source of current, means for suspending the drum from a support, an insulated conductor cord slidable through the ring and having one end secured to the drum for winding thereon, a loop on the other end of the cord for the reception of the tail of an animal for electrically anchoring said cord thereto for actuation thereby, said cord including an uninsulated intermediate portion engageable in the ring for closing an electric circuit to the animal when said cord is unwound from the drum, and a stop on the cord engageable with the ring for arresting said cord as it is rewound on the drum after said uninsulated portion has been disengaged from said ring.

References Cited in the file of this patent

UNITED STATES PATENTS

| | | |
|---|---|---|
| 487,461 | Whitefield | Dec. 6, 1892 |
| 1,411,312 | Swenson | Apr. 4, 1922 |
| 2,623,498 | Gustavsson | Dec. 30, 1952 |